United States Patent

Sharples

[15] 3,663,109
[45] May 16, 1972

[54] VIEWING APPARATUS FOR USE IN A PHOTOMETER

[72] Inventor: Thomas D. Sharples, Atherton, Calif.
[73] Assignee: Beckman Instruments, Inc.
[22] Filed: Apr. 13, 1967
[21] Appl. No.: 630,563

[52] U.S. Cl. ............................................. 356/201, 250/218
[51] Int. Cl. ............................................................ G01n 21/24
[58] Field of Search ................... 356/72, 201, 202, 203, 96; 350/80, 81, 34; 250/218

[56] References Cited

UNITED STATES PATENTS

| | | | |
|---|---|---|---|
| 1,958,280 | 5/1934 | Patterson et al. | 350/34 |
| 2,659,268 | 11/1953 | Grand | 350/81 |
| 2,769,365 | 11/1956 | Loescheke et al. | 356/208 |
| 2,794,366 | 5/1957 | Canaday | 356/202 |
| 3,400,266 | 9/1968 | Yoder et al. | 350/81 UX |

Primary Examiner—Ronald L. Wibert
Assistant Examiner—Orville B. Chew, II
Attorney—Robert J. Steinmeyer and William F. McDonald

[57] ABSTRACT

A low power microscope is optically coupled by a partial reflector to the output light beam passed through a region of a photometer containing a sample of material being investigated. The microscope provides an observable image encompassing the region and is adjustable to bring various portions of the region into sharp focus. The reflector is carried on a base coupled to the end of the microscope so that extreme positions of the latter cause the base to move between a lowered position in which the reflector intercepts a portion of the output light beam and a raised position out of the path of the light beam. In the raised position a portion of the base serves to block the optical path through the viewer to thereby exclude stray light.

7 Claims, 7 Drawing Figures

INVENTOR.
Thomas D. Sharples
BY Flehr, Hohbach, Test,
Albritton & Herbert
Attorneys

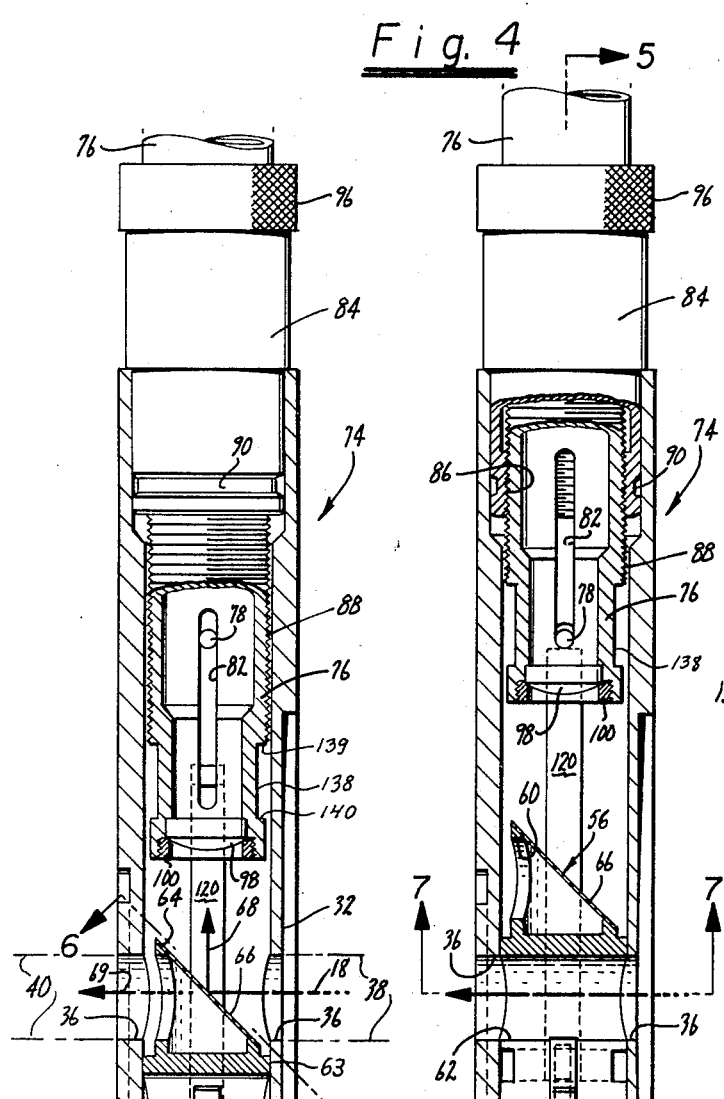

3,663,109

VIEWING APPARATUS FOR USE IN A PHOTOMETER

BACKGROUND OF THE INVENTION

This invention relates to photometers and particularly to spectrophotometers used in the study of the kinetics of chemical reactions. Such spectrophotometers commonly employ a cell or cuvette for containing a sample of material to be studied. The cell defines a region in which a discontinuous change or perturbation of thermodynamic equilibrium of the sample can take place. This is often done by passing a current pulse through the sample to cause rapid heating thereof or by instanteneous stop-flow insertion of unreacted species into the cell. Such perturbations often cause anomalies such as trapped gases and bubbles to form in the sample and ruin experimental results. Furthermore, when high current pulses are used to heat the sample, such entrapped gases can lead to failure of the cells by breakage or damaged electrodes. In some cases it appears that arcing occurs through gas phase so that unwanted light is generated as well as increased pressures. This has necessitated frequent disassembly of the photometer in order to check on the condition of the sample cell and is tome consuming, costly and inconvenient. There is, therefore, a need for apparatus to detect the presence of such anomalies.

SUMMARY OF THE INVENTION

In general, it is an object of the present invention to provide viewing apparatus for providing an observable image of the region containing the sample without significantly disturbing the operation of the photometer.

Another object of the invention is to provide apparatus of the above character which will provide an observable image of the reaction region while permitting the photoelectric recording of optical density changes due to the observed reaction.

Another object of the invention is to provide apparatus of the above character which will permit examining of the condition of the reaction cell immediately before and after a reaction.

Another object of the invention is to provide apparatus of the above character which is of aid in securing the perfection of the photometer optical system by permitting the detection of stray or scattered light as well as providing a check on the optical alignment of the system.

In accordance with the above objects there is provided a photometer system for investigating the kinetics of chemical reactions of samples and materials for observing changes in the optical density responsive to a change in the thermodynamic condition. The photometer includes a source of light supplying a light beam coupled to a region containing a sample and through which the beam passes. A photodetector is positioned to receive at least a portion of the output light beam passing through the region and provides an output signal indicative of the strength of the received beam. Changes in the optical density of the sample are directly sensed by the photodetector. Viewing means is provided for creating an observable image of said region. The optical path through the viewing means is selectively blocked to exclude stray light from entering the system.

These and other objects and features of the invention will become apparent from the following description and claims when taken in conjunction with the accompanying drawings.

DETAILED DESCRIPTION

Referring to the drawings.

FIG. 3 is a cross-sectional view taken along the lines 3—3 of FIG. 2.

FIG. 4 is a cross-sectional view of the apparatus similar to FIG. 3 but showing the reflector element moved into a withdrawn position.

FIG. 5 is a cross-sectional view taken along the lines 5—5 of FIG. 4.

FIG. 7 is a cross-sectional view taken along the lines 7—7 of FIG. 4.

Figures 1, 2, 6:
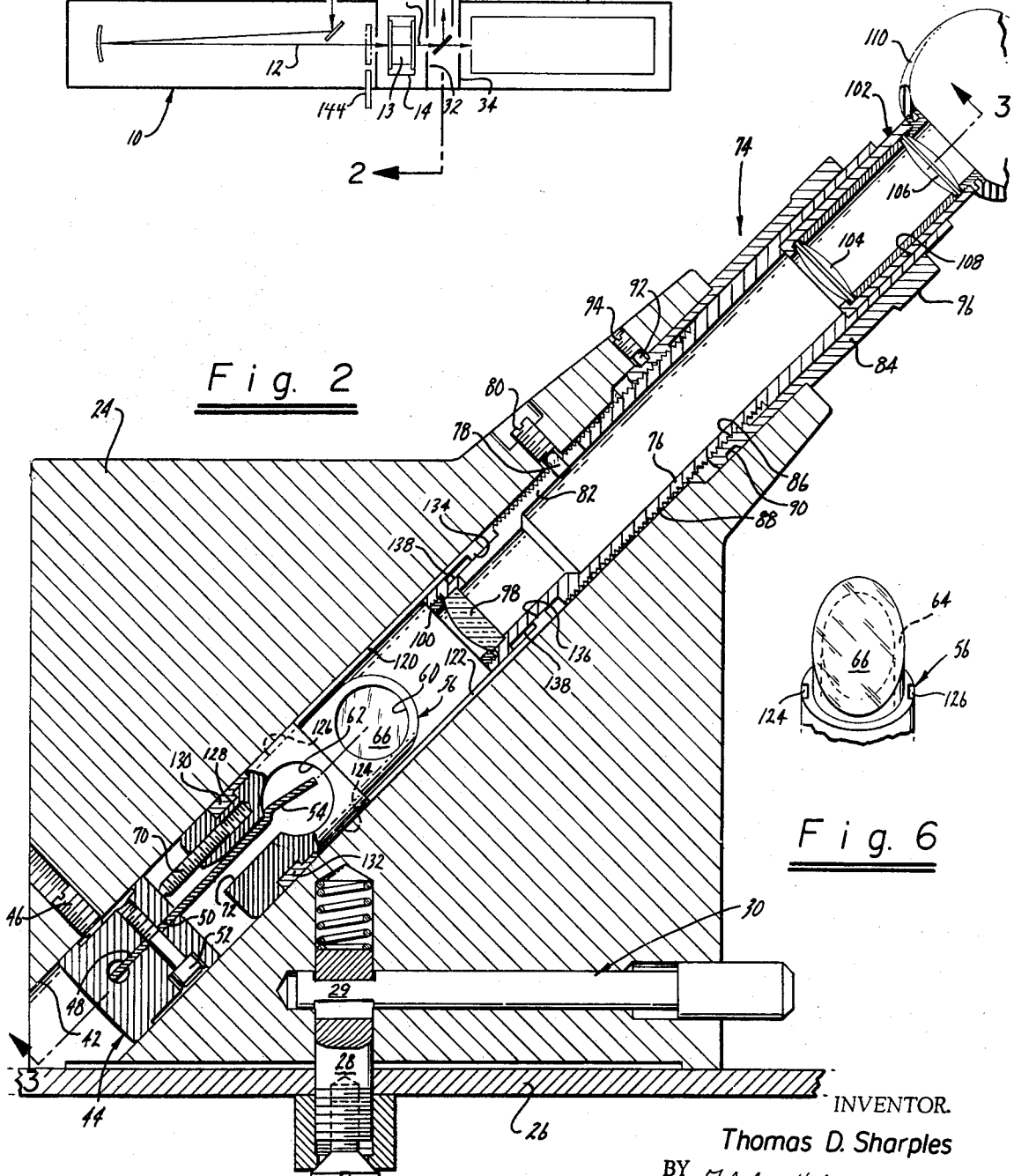
FIG. 1 is a diagrammatic view of a preferred embodiment of spectrophotometer apparatus incorporating the invention.
FIG. 2 is a cross-sectional view of the photometer apparatus of FIG. 1 taken along the lines 2—2.
FIG. 6 is a view taken along the lines 6—6 of FIG. 3.

Referring to FIG. 1, there is illustrated a photometer constructed according to the invention and including a source 10 of light which may be monochromatic as in a conventional spectrophotometer. The light is formed into a beam 12 which impinges on a sample containing region 13 within a cell 14 mounted in a suitable frame 16. At least a portion of the output light beam 18 passed by region 13 is received by a photodetector 20 which provides an output signal indicative of the strength thereof to conventional display means, such as an oscilloscope (not shown).

Referring more particularly to FIGS. 1 through 7, there is provided viewing means for creating an observable image of region 13 and consists of a reflex viewer 22 incorporated in a housing or frame block 24. An optical bench or base member 26 supports source 10, frame 16, frame block 24 and detector 20 in suitable optical alignment. As shown in FIG. 2, block 24 is provided with an adjustable T-bolt 28 which is activated by an eccentric 29 incorporating locking mechanism 30 to thereby clamp the block to optical bench 26. As shown in FIGS. 3 through 5, block 24 is provided with spaced parallel side faces 32, 34 between which is formed an aperture 36 which is aligned with similar apertures 38, 40 in the frame 16 and detector 20 so that the output light beam passing from the region 13 successively traverses apertures 38, 36 and 40.

A cylindrical passageway or bore 42 is formed in block 24 and extends generally between parallel surfaces 32, 34 and intersects aperture 36 at a right angle thereto. An adjusting stop 44 is carried at the lower end of passageway 42 and is secured in an adjustable position by a set screw 46. Adjusting stop 44 carries a leaf spring 48 which extends upwardly and generally centrally within the passageway. Leaf spring 48 is secured to block 44 by being pressed in a slot 50 formed therein and secured with cap screw 52. Leaf spring 48 is generally flat and straight having a bent portion 54 at its upper end.

A reflector base member 56 is mounted for sliding movement between a first, raised position and a second, lowered position within passageway 42 and above adjusting stop 44. The reflector base 56 is formed of a cylindrical block provided with a pair of spaced apart first and second apertures 60, 62 therein which are formed and aligned in such a manner that one of apertures 60, 62 coincides with the aperture 36 when the reflector base is in one of the raised or lowered positions. A light block 63 separates apertures 60, 62 for a purpose to be hereinafter explained. The portion of the reflector base surrounding the upper aperture is formed with a surface 64 cut at an angle of 45° to apertures 36 and 60 and serves as means for mounting a partially reflective element 66 which diverts a portion of the output light beam 18 into passageway 42 along arrow 68. Reflective element 66 is preferably formed from a thin film or pellicle of transparent plastic material or thin glass which may have partially reflective coating. The reflective element 66 serves to reflect approximately 10 percent of the light impinging thereon while permitting the remainder of the beam 69 to pass through.

The lower end of reflector base carries an adjusting screw 70 which extends toward stop 44 for determining a lowermost limit of travel of base 56 and permitting exact alignment of aperture 60 with respect to aperture 36. A passageway 72 extends axially through the lower end of the reflector base and into the aperture 62 and serves to receive leaf spring 48. When base 56 moves through intermediate positions spring 48 is displaced and as the base is lowered to the bottom the bent portion 54 of spring 48 snaps laterally into aperture 62 to provide positive downward positioning of the reflector base and proper alignment of the apertures 60 and 36.

Viewing means further consists of a microscope assembly 74 mounted in the upper portion of passageway 42. Microscope assembly 74 comprises a microscope tube 76 held in position for restricted longitudinal movement in passageway 42 by a pin 78 carried on the end of a screw 80 threaded through frame block 24. Pin 78 engages a longitudinally extending slot 82 formed in the outer wall of tube 78. An adjusting sleeve 84 having interior threads 86 engages exterior threads 88 provided on tube 76. Sleeve 84 has a circumferential groove 90 formed therein which is engaged by a pin 92 carried on the end of a screw 94 threadedly passed through block 24. Pin 92 permits rotation of sleeve 84 but prevents its longitudinal movement so that rotation thereof causes longitudinal movement of tube 76 in passageway 42. The upper end of sleeve 84 extends upwardly out of the passageway and is formed with a knurled knob 96 to facilitate operation.

Microscope tube 76 carries an objective lens 98 at its lower end which is secured therein by threaded ring 100. A suitable eyepiece 102 including a field lens 104 and eye lens 106 is slid down into a well 108 in the upper end of tube 76 for forming an observable image of region 13. The focusing distance of the microscope is selected so that region 13 is in focus when the adjusting nut is approximately in the midrange of travel of threads 86, 88. In this way, various portions of region 13 can be examined by turning the nut 96 to thereby provide an observable image of the region. Eyepiece 102 is provided with a flexible eye cup 110 so that the operator looks into the eyepiece, ambient light is excluded.

Eyepiece 102 is easily removed by sliding it upwardly out of well 108. This permits photographic equipment such as camera 112 or an image converter 114 (for work in the ultraviolet or infrared) to be installed (as shown in FIG. 1). In any case, either the photographic equipment, image converter or the face of the operator will serve to selectively block the light path through the microscope to thereby exclude ambient light from entering the photometer.

Means is provided for carrying the reflector base between the raised and lowered positions and consists of a pair of coupler leaves 120 and 122 passing longitudinally along opposite sides of the passageway 42 and fit into longitudinal slots 124, 126 formed in reflector base. A circumferential recess 128 receives projections 130, 132 formed at the lower end of each leaf so that the reflector base is positively carried up and down in passageway 42 by movement of the leaves. The upper ends of the leaves have projections 134, 136 which are coupled to elongate annular groove 138, formed in the lower end of the microscope tube 76. Groove 138 is wider than the projecting portions 134, 136 of the leaves by an amount slightly larger than the distance of travel between the raised and lowered positions of reflector base 56.

In operation downward movement of the microscope tube 76 causes the upper shoulder 139 of groove 138 to drive the leaves downwardly until the reflector base is positively positioned at its lower position. The viewer is then ready to use in observing region 13. When it is desired to disable the viewer, the sleeve 84 is turned to cause upward movement of the microscope tube 76 until the lower shoulder 140 of groove 138 lifts the leaves and reflector base upwardly into a withdrawn position, as shown in FIGS. 4 and 5. The limit of this position is defined by contact between the lower shoulder 140 of groove 138, projection 134, and pin 78. In the withdrawn position light block 63 is also brought upwardly into a position above aperture 36 to completely block access between aperture 36 and the microscope lying in the upper end of passageway 42 (FIG. 7).

Accordingly, there is provided a viewing apparatus for use in a photometer which facilitates visual or photographic observing the physical condition of a sample contained in a reaction cell while simultaneously photoelectrically sensing the optical density changes due to reaction in the sample. Particularly, the invention permits the examination of the sample condition immediately before, during and after a reaction and is particularly useful for experiments in which a temperature change is induced in the sample so that the presence of bubbles or entrapped gasses can be detected before damage results to the equipment. To aid in observing all regions of the sample the focus of the viewing apparatus is adjustable and a light scattering plate 144 can be provided, as in light source 10, for diffusely illuminating region 13 by scattering the incident light beam. By using the viewing apparatus of this invention successive temperature jump runs experiments can be run while maintaining continuous inspection for proper filling of the sample tube and without requiring removal of the tube or disassembly of the photometer.

The present invention is of great advantage when applied to flow through sample cells such as those used for stop-flow studies and permits the analysis of effects that are not associated with a chemical reaction such as the presence of particles, bubbles, flow birefringence due to poor mixing, cavitation and the like. Moreover, by utilizing the present invention, the optical alignment of the photometer can be checked, sources of stray and scattered light and accidental displacement of elements making up the optical trains, such as limiting stops, can be discovered.

To those skilled in the art to which the invention relates many alternative procedures and changes will occur without departing from the spirit and scope of the invention. For example, alternate beam splitting devices, such as diagonal silvered cube prisms, strip silvered reflectors, pierced solid reflectors and interrupted rotating mirrors are all well known and may be substituted for the reflective element shown herein. Also, the mechanism provided herein for raising and lowering the reflector block could easily be effected by independent means rather than by being coupled to the microscope although the latter is a particularly convenient arrangement requiring a minimum of parts. Accordingly, the descriptions and disclosures herein are intended to be illustrative of a preferred embodiment of the invention and are not to be taken as a limitation thereon.

I claim:

1. In a reaction kinetics system including a reaction cell for containing samples to be reacted, a source of light for transmitting a beam of light in a selected path through the reaction cell, a photodetector for sensing the light beam as it emerges from the reaction cell and providing an electrical output signal, a base member for carrying and maintaining in optical alignment the light source, the reaction cell, and the photodetector, and a first housing enclosing the light source, the reaction cell and the photodetector, the improvement comprising a viewing apparatus for providing an image of reaction taking place in the reaction cell comprising:

a second housing at least a portion of which is positioned within said first housing and including a pair of diametrically opposed apertures optically aligned with each other in the path of the light beam passing through the reaction cell to define a first passageway and a second passageway intercepting said first passageway formed by said apertures, a reflector base member slidably disposed within said second passageway, said reflector base member including first and second spaced apertures passing therethrough and orientated generally parallel to the light beam path, and means for reflecting a portion of the light beam disposed across said first aperture at a predetermined angle with respect to the path of the light beam, means for selectively moving said reflector base member between a first and a second position whereby said first and second apertures, respectively, are brought into alignment with the first passageway in the housing to transmit the light beam, a portion of the light beam being reflected through said second passageway when said reflector base member resides in said first position, and, means for viewing the image carried by the light beam reflected through said second passageway.

2. In a reaction kinetics system, a viewing apparatus as defined in claim 1 wherein the reflector base member further includes a light-opaque member positioned between said first and second apertures formed in the reflector base member to prevent light from reaching said first passageway through said second passageway when the reflector base member is in said second position.

3. In a reaction kinetics system, a viewing apparatus as defined in claim 1 wherein the viewing means comprises a microscope having an optical axis and means for mounting said microscope for movement along said optical axis.

4. In a reaction kinetics system, a viewing apparatus as defined in claim 3 wherein said means for selectively moving said reflector base member between a first and a second position include a pair of coupler leaves secured between said microscope and said reflector base member.

5. In a reaction kinetics system, a viewing apparatus as defined in claim 1 wherein said reflector base member comprises a cylindrical member having an upper surface disposed at approximately 45° angle with respect to the light beam and a partially reflective member mounted on the upper surface.

6. In a reaction kinetics system, a viewing apparatus as defined in claim 5 comprising in addition an adjustable stopping member disposed at the lower end of the second passageway to limit the downward travel of said reflector base member.

7. In a reaction kinetics system, a viewing apparatus as defined in claim 6 comprising in addition a spring member secured to said adjustable stopping member and cooperating with said reflector base member to ensure that said first aperture in said reflector base member is in exact alignment with said first passageway in said housing when said reflector base member resides in said first position.

* * * * *

PO-1050
(5/69)

UNITED STATES PATENT OFFICE
CERTIFICATE OF CORRECTION

Patent No. 3,663,109            Dated May 16, 1972

Inventor(s) Thomas D. Sharples

It is certified that error appears in the above-identified patent and that said Letters Patent are hereby corrected as shown below:

Column 5, line 2, change "1" to read -- 2 --

Signed and sealed this 19th day of September 1972.

(SEAL)
Attest:

EDWARD M. FLETCHER JR.            ROBERT GOTTSCHALK
Attesting Officer                 Commissioner of Patents